Patented Feb. 20, 1934

1,948,194

UNITED STATES PATENT OFFICE 1,948,194

METAL-FORMING LUBRICANTS

Robert C. Williams, Columbus, Ohio, assignor, by mesne assignments, to The Ironsides Company, Columbus, Ohio, a corporation of Ohio No Drawing. Application November 17, 1931
Serial No. 575,638

8 Claims. (Cl. 205—21)

My invention relates to metal-forming lubricants and method of using the same. It has to do particularly with the provision of a novel type of lubricant for use in various metal-forming operations. It is particularly applicable for use in the drawing of wire, although it is not limited thereto.

One of the objects of my invention is to provide a material for lubricating metals which will reduce the friction between the metal being formed and the metal or other part that contacts with it during the drawing or stamping operation. For example, in wire drawing, the use of a lubricant to reduce the friction between the wire and the die will reduce the power required for the drawing operation in proportion to the effectiveness of the lubricant. Similar improvements may be effected by use of my invention in other metal-forming operations, such as deep stamping.

Another object of my invention is to provide a lubricant for metal-forming operations which will be more efficient in operation than present known lubricants. It is generally recognized that the lubricants now generally used are possessed of a comparatively low degree of efficiency.

Another object of my invention is to provide a method of applying the lubricants to be used which will effectively increase the adhesiveness of the lubricant to the metal parts and which will increase the general effectiveness thereof.

I have conducted extensive researches on the efficiency of various lubricants and have discovered that waxes and wax-like substances form highly efficient lubricants in metal-forming operation. I have further found that such waxes or wax-like substances are particularly effective as lubricants when they are used in a finely divided state, but that the superiority of such lubricants is lost, in whole or in part, when the temperature of the lubricant is high enough to change the wax particles into a mobile liquid before they enter the die. Therefore, my invention preferably contemplates the use of wax, wax-like substances, or a combination of waxes having sufficiently high melting points or ranges to avoid conversion of the wax into a mobile liquid at the temperatures at which the lubricant is applied to the die or other metal-forming parts.

More specifically, my invention preferably contemplates the dispersion of the wax or of the combination of waxes or materials having the properties of wax in the form of a concentrated paste. This concentrated paste may then be mixed in suitable proportion with water, a dilute soap solution, or such other vehicle as may be selected. For example, beeswax may be so dispersed and proportionately mixed with the proper vehicle and then applied to those parts of the metal requiring lubrication. Under usual conditions of operation, beeswax and the other waxes to be subsequently mentioned will have a melting point adequately high to preclude deterioration into a mobile liquid. However, if necessary, supplementary means may be used or steps taken to insure against such melting. The lubricant may be applied to the parts to be lubricated, in any suitable manner.

While I have given beeswax as a specific example, it is to be understood that other waxes can be used. Two or more waxes may be used in combination and, in general, the wax-like substances may be used effectively. As examples of other waxes which may be used, I may cite paraffins, carnauba, montan and similar wax-like substances. As a dispersing medium, I may use an aqueous soap solution, or I may use a non-aqueous material, as for example, glycerin.

In order to make clear the effects of using combinations of waxes, I may cite that commercial beeswax which I have used in my experiments has a melting point of about 145° F., while the carnauba wax which I have used has a melting point of about 180° F. In some metal-forming operations, I have found that the temperature of the lubricant is sufficiently high to melt the beeswax, thus rendering it less efficient as a lubricant. By properly proportioning the amounts of beeswax and carnauba wax, I have found it possible to materially raise the temperature at which the wax particles become a mobile liquid, or in other words increase the melting range. Likewise, a commercial Montan wax which has a melting point of about 180° F., when properly proportioned with beeswax, raises the melting range of the resulting composite wax.

My experiments indicate that the superior properties of my lubricant are dependent, to a substantial extent, upon the presence of finely divided wax particles. Furthermore, even though a soap solution is used as a vehicle, nevertheless, the lubricating effect is only due to the soap solution to a minor extent.

One example of the highly efficient character of beeswax as a metal-forming lubricant consists of the fact that I have found that such a lubricant, used in the drawing of copper wire, reduced the power required to draw the wire through a given die as much as 40%, as compared with drawing wire when a tallow and soap emulsion was used.

Another example of the efficiency of one of my dispersed wax lubricants has been demonstrated in the drawing of .0225 inch diameter hard-drawn copper wire through a .0201 diameter Unwidia die. In this operation, the pull when water was used as the lubricant was 16.7 pounds, and when a dispersion of about 1.5% of beeswax in an aqueous soap solution containing approximately 0.17% of soap was only 9.0 pounds. This represents a reduction of approximately 46% in the force required to draw the wire through the die.

While a dispersion of tallow alone made by the methods which I use in making my wax dispersions does not possess superior lubricating properties, I have found that a blend of wax-like composition consisting of one or more waxes with additions of tallow in minor proportions can be dispersed to form highly efficient lubricants. As an example, I may blend a minor proportion of tallow or similar material with a major proportion of a hard wax, such as Montan wax, thereby producing a blended wax-like composition which when suitably dispersed has superior lubricating properties.

It will be seen that I have provided a lubricant for the purpose indicated of an unusually high degree of efficiency and that the method which I use in applying this lubricant is likewise highly desirable. The increased efficiency of my lubricant will naturally decrease the wear on the die or other metal-forming parts, will decrease breakage in the metal being formed, as for example in wire being drawn or other parts being formed. Likewise the use of my more efficient lubricant will decrease the stress in the metal-forming operation.

It will also be understood that my lubricants have further desirable properties, in that they form dispersions which can be removed from the metal by means of aqueous solutions. Furthermore, these lubricants do not corrode the metal and, therefore, aid in obtaining or maintaining bright finishes.

In the use of the term "wax" in this specification, it is intended to include either a single wax, commercial or otherwise, or a blend of two or more waxes or wax-like compositions.

Having thus described my invention, what I claim is:

1. A lubricant for metal-drawing or stamping operations comprising wax or wax-like substances which will remain in the form of solid or semi-solid particles at the usual temperatures encountered in metal-drawing or stamping operations, and prior to the contact of the parts to be lubricated said particles being suitably dispersed in a liquid vehicle.

2. A lubricant for metal-drawing or stamping operations comprising a plurality of wax or wax-like substances which are mixed together and which will remain in the form of solid or semi-solid particles at the usual temperatures encountered in metal-drawing or stamping operations, and prior to the contact of the parts to be lubricated said particles being suitably dispersed in a liquid vehicle.

3. A method of lubricating the contacting parts in metal-drawing or stamping operations which comprises applying a fluid embodying fine particles of wax having a sufficiently high melting point or melting range to prevent conversion of the wax into a mobile liquid at the usual temperatures encountered in the drawing or stamping operations and prior to the contact of the parts to be lubricated.

4. A lubricant for metal-drawing or stamping operations comprising a wax in fine particles of sufficiently high melting point or melting range to prevent conversion of the wax particles into a mobile liquid at the temperatures usually encountered in metal-drawing or stamping operations and prior to the contact of the parts to be lubricated, said wax comprising beeswax.

5. A lubricant for metal-drawing or stamping operations comprising a dispersion of fine particles of wax of sufficiently high melting point or melting range to prevent conversion of the wax particles into a mobile liquid at the temperatures usually encountered in metal-drawing or stamping operations and prior to the contact of the parts to be lubricated, said wax comprising beeswax.

6. A lubricant for metal-drawing or stamping operations comprising a dispersion of fine particles of wax which is made up of a blend of waxes or wax-like substances wherein the melting point or melting range is sufficiently high to prevent conversion of the wax particles into a mobile liquid at the temperatures usually encountered in metal-drawing or stamping operations and prior to the contact of the parts to be lubricated.

7. The method of lubricating the contacting parts in metal-drawing or stamping operations which comprises applying to the parts to be lubricated a dispersion of fine particles of wax having a sufficiently high melting point or melting range to prevent conversion of the wax into a mobile liquid at the temperatures usually encountered during the metal-drawing or stamping operations and prior to the contact of the parts to be lubricated.

8. A lubricant for metal-drawing or stamping operations comprising a dispersion in the form of a concentrated paste of fine particles of wax or wax-like substances which will remain in the form of solid or semi-solid particles at the usual temperatures encountered in metal-drawing or stamping operations and prior to the contact of the parts to be lubricated.

ROBERT C. WILLIAMS.